UNITED STATES PATENT OFFICE.

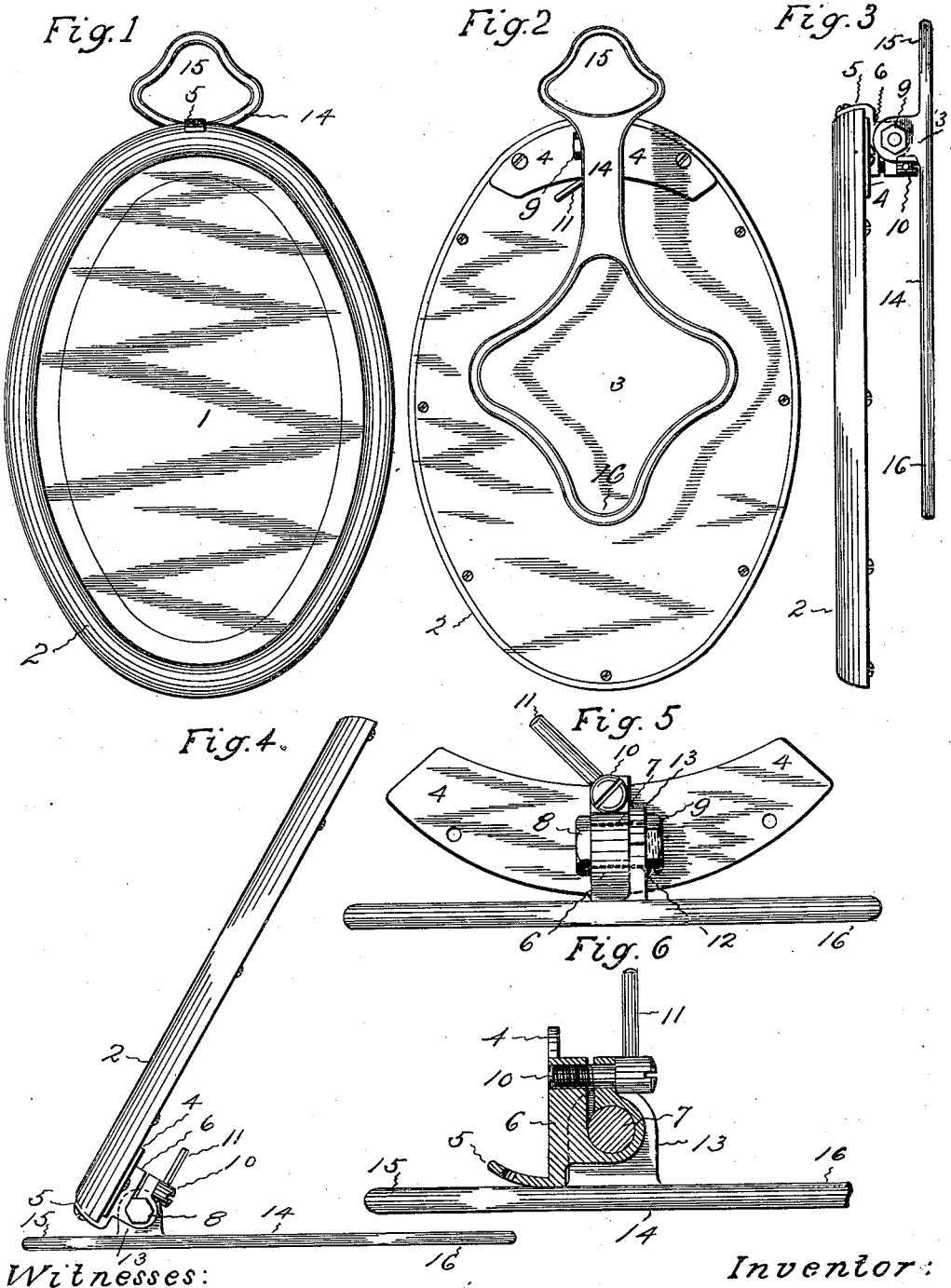

GEORGE H. PRATT, OF WHITE PLAINS, NEW YORK, ASSIGNOR TO ART BRASS COMPANY, OF NEW YORK, N. Y., A CORPORATION OF NEW YORK.

TOILET-MIRROR.

990,588.     Specification of Letters Patent.     Patented Apr. 25, 1911.

Application filed March 7, 1910. Serial No. 547,785.

*To all whom it may concern:*

Be it known that I, GEORGE H. PRATT, a citizen of the United States, residing at White Plains, in the county of Westchester and State of New York, have invented a new and useful Improvement in Toilet-Mirrors, of which the following is a specification.

This invention relates to a mirror which has a support so hinged that the mirror may be hung against a wall or placed upon a table or any other convenient piece of furniture.

The object of the invention is to provide a mirror with a very simple support which may be turned parallel with the back of the mirror and engaged with a nail, or hook, so the mirror will hang vertically against a wall, or may be turned at an angle with the back of the mirror and used as a horizontal base, for supporting the mirror at any desired inclination, when placed upon a table or other piece of furniture.

Figure 1 of the accompanying drawings shows a front view, reduced scale, with the support in hanging position. Fig. 2 shows a back view with the support in the same position. Fig. 3 shows an edge view with the parts in the same positions as shown in Figs. 1 and 2. Fig. 4 shows an edge view with the mirror standing up from the support, arranged horizontally. Fig. 5 shows a back view, full scale, of the support removed from the mirror, with the supporting frame in horizontal position. Fig. 6 shows a section of the hinge clamp and an edge view of a small portion of the support frame.

The mirror plate 1, may be round, oval or angular, and may be plane or beveled, as desired. The edges of this plate are secured in a frame 2, and extending across the back and secured to the frame is a back plate 3. Attached to the back plate at one edge of the mirror, by wings 4 and to the frame by a lug 5, is a bracket 6. This bracket is perforated, and extending therethrough is a bolt 7 which at one end has a head 8, and at the other end has a nut 9. The bracket is slitted from one side to the perforation, so that the bolt may be clamped, and extending through one portion and into the other portion of the slitted bracket is a screw 10 that is desirably provided with a pin 11, by means of which it may be easily turned. When the screw is loosened, the parts of the bracket spring sufficiently to allow the bolt to turn freely in the bracket opening. When the screw is tightened, the bolt is clamped and held fast. A portion 12, Fig. 5, of the bolt is square, and fitting this square portion of the bolt is a square opening in an ear 13, which extends from the support 14. This support, at one end, has a loop 15, and at the other end has an open frame 16. The ear is nearer the loop 15 than it is to the frame 16.

When the support is turned parallel with the plane of the back, as shown in Figs. 1, 2 and 3, the mirror may be supported vertically against a wall by hanging the loop 15 on a nail or hook. The mirror when supported in this position may, if desired, be turned out so that its face is at an angle with the face of the wall. If it is desired to use the mirror on a table, chiffonnier, or other piece of furniture with a horizontal surface, the support is turned at an angle with the back of the mirror, as shown in Fig. 4. The mirror may be arranged to stand at any angle with relation to the horizontal surface upon which the support rests by loosening and then tightening the clamp screw which binds the hinging bolt. For packing and shipping the support is turned parallel with the base, as shown in Fig. 3.

The invention claimed is:

The combination with a mirror, of a frame therefor, a back secured to said frame, a perforated and slitted bracket having wings fastened to the back and having a lug fastened to the frame near one edge, a screw for contracting the perforation in the slitted bracket, a support having a hanging loop at one end and a perforated ear that projects from one face near the said hanging loop, and a hinging bolt passing through the perforated bracket and the perforated ear in such manner that the support may be turned on the hinge so as to extend parallel with the plane of the mirror and its loop used as a hanger, or the support may be turned on the hinge so as to extend at right angles with the plane of the mirror, and may be used as a supporting stand.

GEORGE H. PRATT.

Witnesses:
FREDERICK WM. EGGERS,
CLARENCE J. COOK.

Copies of this patent may be obtained for five cents each, by addressing the "Commissioner of Patents, Washington, D. C."